(12) United States Patent
Ryan

(10) Patent No.: US 10,154,413 B1
(45) Date of Patent: Dec. 11, 2018

(54) SELF-MASKING RECEIVE SYSTEM

(71) Applicant: Gerald P. Ryan, Geneva, IL (US)

(72) Inventor: Gerald P. Ryan, Geneva, IL (US)

( * ) Notice: Subject to any disclaimer, the term of this patent is extended or adjusted under 35 U.S.C. 154(b) by 0 days.

(21) Appl. No.: 15/917,609

(22) Filed: Mar. 10, 2018

Related U.S. Application Data

(60) Provisional application No. 62/578,849, filed on Oct. 30, 2017.

(51) Int. Cl.
*H04M 1/66* (2006.01)
*H04W 12/08* (2009.01)
*H04W 12/04* (2009.01)

(52) U.S. Cl.
CPC ........... *H04W 12/08* (2013.01); *H04W 12/04* (2013.01)

(58) Field of Classification Search
CPC ............................. H04W 12/08; H04W 12/04
USPC ............... 455/411, 410, 418, 422.1
See application file for complete search history.

(56) References Cited

U.S. PATENT DOCUMENTS

| | | | | |
|---|---|---|---|---|
| 2008/0233958 A1* | 9/2008 | Robbins | ............ | H04W 36/0094 455/436 |
| 2010/0222063 A1* | 9/2010 | Ishikura | ................. | H04B 7/024 455/450 |
| 2014/0177563 A1* | 6/2014 | McGowan | ............ | H04L 27/265 370/329 |

* cited by examiner

*Primary Examiner* — Nghi H Ly
(74) *Attorney, Agent, or Firm* — Clifford H. Kraft

(57) ABSTRACT

A security access system that uses a masking signal transmitted simultaneously with a transmission from a remote Fob or smartphone to mask the transmitted code signal. The remote unit acts in the classical way, as a transmitter only. However, the Base has both receive and transmit functionality. The added transmitter within the Base is used to create a self-generated masking signal. This signal, while fully known to the base, is unknown to any other receiver (including that of an eavesdropper) in the area. Thus only the Base Receiver can subtract out this added signal from the composite signal it receives to recover the access code.

17 Claims, 10 Drawing Sheets

SELF-MASKING RECEIVE SYSTEM

This application is related to, and claims priority from, U.S. Provisional Patent application No. 62/578,849 filed Oct. 30, 2017. Application No. 62/578,849 is hereby incorporated by reference in its entirety.

BACKGROUND

Field of the Invention

The present invention relates generally to secured wireless communication.

Description of the Problem Solved

Wireless communication is commonplace today. However, where there is wireless communication, there is the opportunity for eavesdropping. Therefore, as the field of wireless communication continues to grow in application and in popularity, the need for enhanced wireless communication continues to grow along with it.

While two way communication can be appealing to the eavesdropper, one-way communication is of particular interest. Specifically one-way wireless communication, as used for secured remote access, is particularly appealing to the criminal eavesdropper. Therefore, the description of the present invention will be focused on keyed remote access. However, the Self-Masking Receive System of the present invention can be extremely useful in secured two-way communication—especially in law enforcement, intelligence, and military applications.

Remote access by RF and other methods is commonplace today. It is extremely convenient to be able to access the use of a car, house, or any other secured asset without the use of a mechanically operated key. Remote access systems of today are typically simple Transmit-Receive systems where the remote access FOB (Frequency Operated Button or Fob) is the transmitter (Tx) and the remote access Base is the receiver (Rx).

But the benefits, though many, of remote access do not come without risk. Remote entry devices can be defeated by a number of means currently in use today. A commonly used scheme is to record the signal emitted by the Remote Keyless Entry device (RKE) and then replaying this recording at a later time to gain access to the asset (usually a car or an older type garage door). It would be extremely advantageous to have a remote access system that is more difficult to defeat. Such a system, if secure enough, finds application in fields where remote access is not currently used; or if used, used with greater security. Such additional applications can include but would not be limited to; hotel rooms, rental cars, building access and credit payment systems (i.e. credit cards). Thus one key could secure access to any number of assets. The invention described herein, relates to a new, and far more secure method to enhance remote access security. It should be noted that most newer garage door openers transmit either encrypted signals or rolling codes. In both cases, each subsequent transmission by the remote unit is different. However, these methods require considerable processing power in the remote units. Also, there is a very difficult problem with these units when the remote unit is triggered out of range of the base station, since the codes become misaligned. Very complex look-ahead algorithms must used to re-establish alignment.

SUMMARY OF THE INVENTION

The Self Masking Receiver (SMR) System of the present invention is a communication system that employs receiver self-masking as a way of making clean interception of a transmitted access code highly difficult. The SMR, as used for remote entry (SMRre), includes two components: 1) a Base and 2) a Remote Key (widely known today as the Fob). The Base resides within the secured asset, and the Remote Key Fob (RK Fob) is mobile and typically carried by the user.

In the present invention, the remote key ideally acts in the classical way, as a transmitter only. However, the Base has both receive and transmit functionality. The added transmitter within the Base of the SMRre is used to create a self-generated masking signal. This signal, while fully known to the base, is unknown to any other receiver (including that of an eavesdropper) in the area. Thus only the Base Receiver can subtract out this added waveform from the composite signal it receives (containing both the Tx from the Fob and the Tx from the Base).

DESCRIPTION OF THE FIGURES

Attention is now directed to several figures that illustrate features of the present invention.

The SMRre RK Fob can pick the frequency and modulation plan and communicate this to the base by way of a sync message Several figures and illustrations have been provided to aid in understanding the present invention. The scope of the present invention is not limited to what is shown in the figures.

DETAILED DESCRIPTION OF THE PREFERRED EMBODIMENTS

The present invention related to a device that is capable of secured remote entry using radio communication.

The device includes at least two components: 1) A Base Receiver Unit which can have both Receiver and Transmitter functionality; 2) Remote Access Key (Fob) which can operate as a code transmitter.

Figure 1:
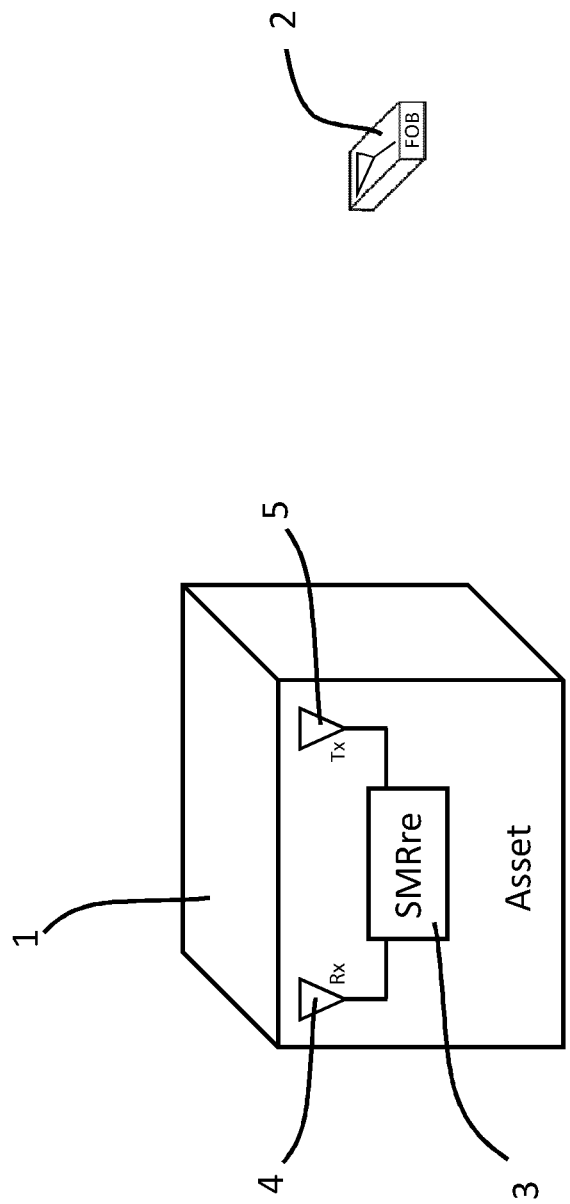
FIG. 1 shows the overview of the system components of an embodiment of the present invention.

FIG. 1 shows a preferred embodiment. A secured Asset 1, the SMRre Remote Key Fob 2, The SMRre Base 3 with receive antenna 4 and transmit antenna 5.

Figure 2:
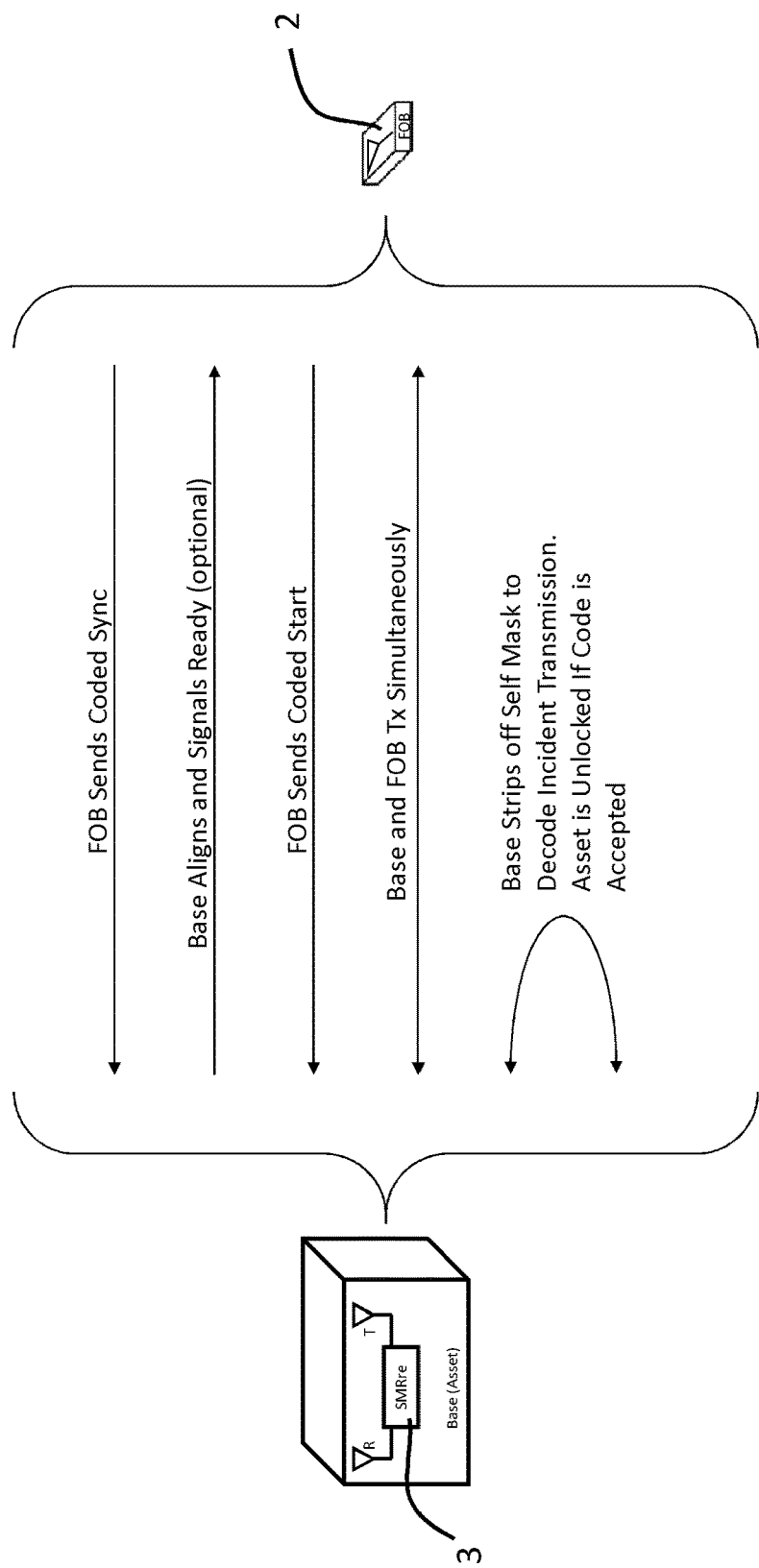
FIG. 2 shows a simplified sequence of events corresponding to the Fob and Base actions of the SMRre system.

FIG. 2 shows a sequence of correspondence and actions between the SMRre Base 3 and the SMRre Remote Key Fob 2.

Figure 3:
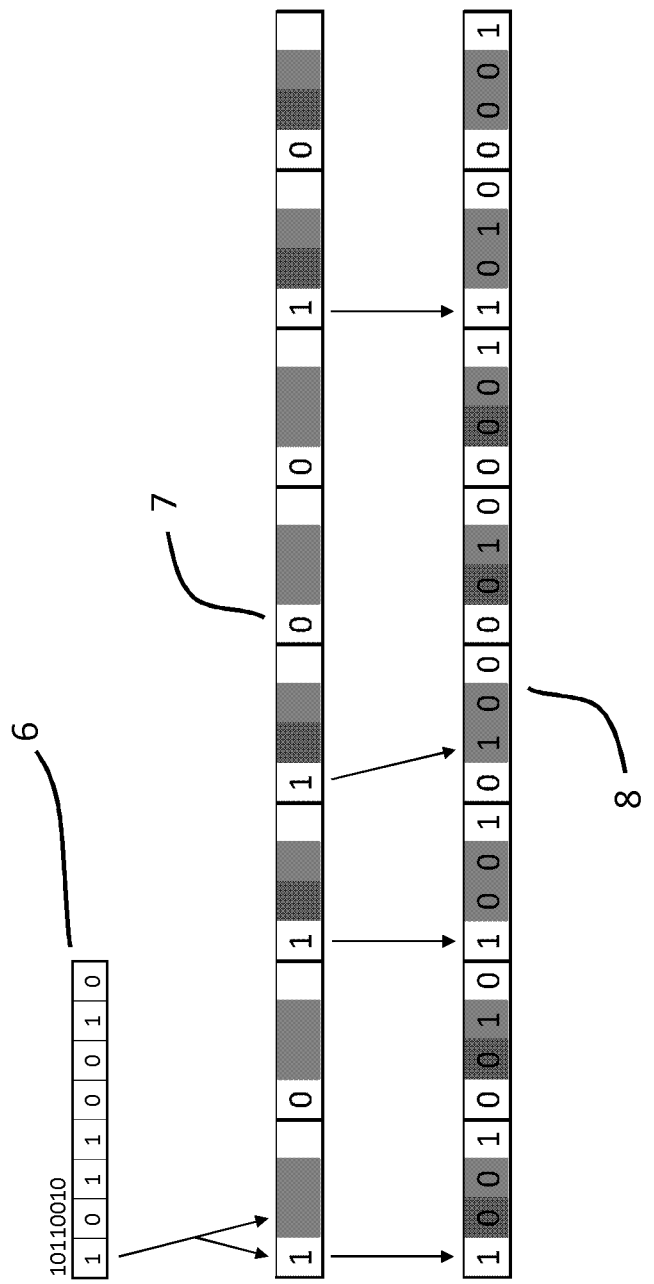
FIG. 3 shows an example of the data pattern encoding in one type of SMRre OOK coding scheme.

FIG. 3 shows key code sequence 6 time expanded into general scheme 7 and applied specifically to code frame 8.

Figure 4:
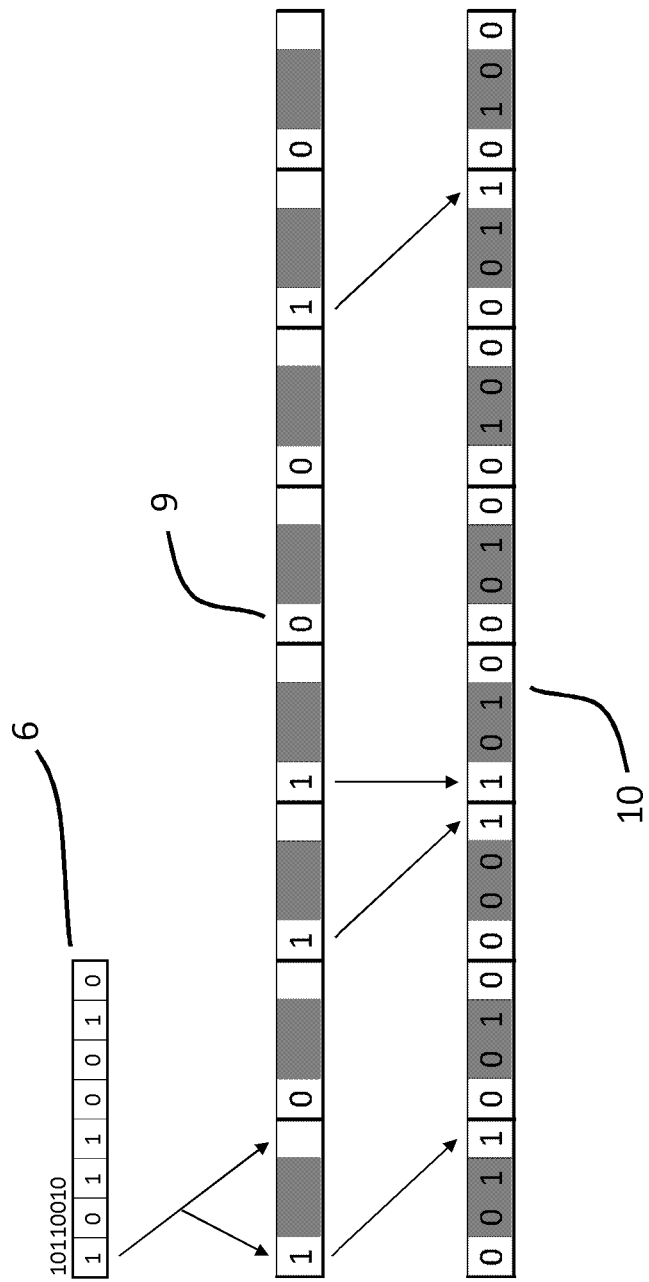
FIG. 4 shows an example of the data pattern encoding in a second type of SMRre OOK coding scheme.

FIG. 4 shows key code sequence 6 time expanded into general scheme 9 and applied specifically to code frame 10.

Figure 5:
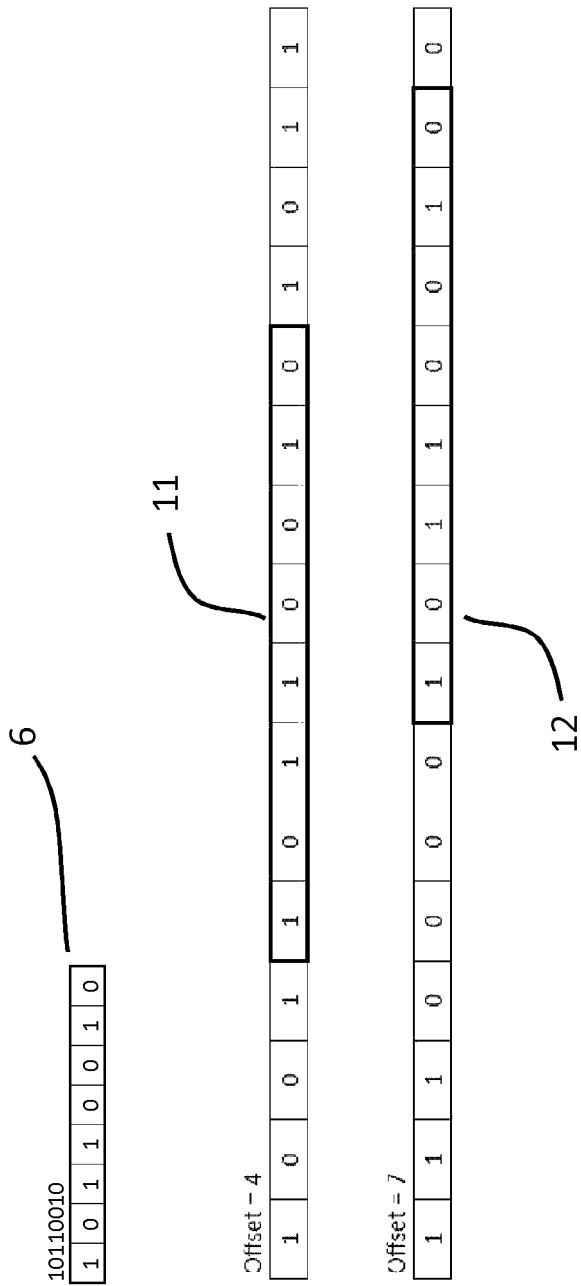
FIG. 5 shows examples of Active Key Code Symbol Shifting.

FIG. 5 shows an example of Symbol Shifting of Key Code Sequence 6 into Active Code Frames 11 and 12.

Figure 6:
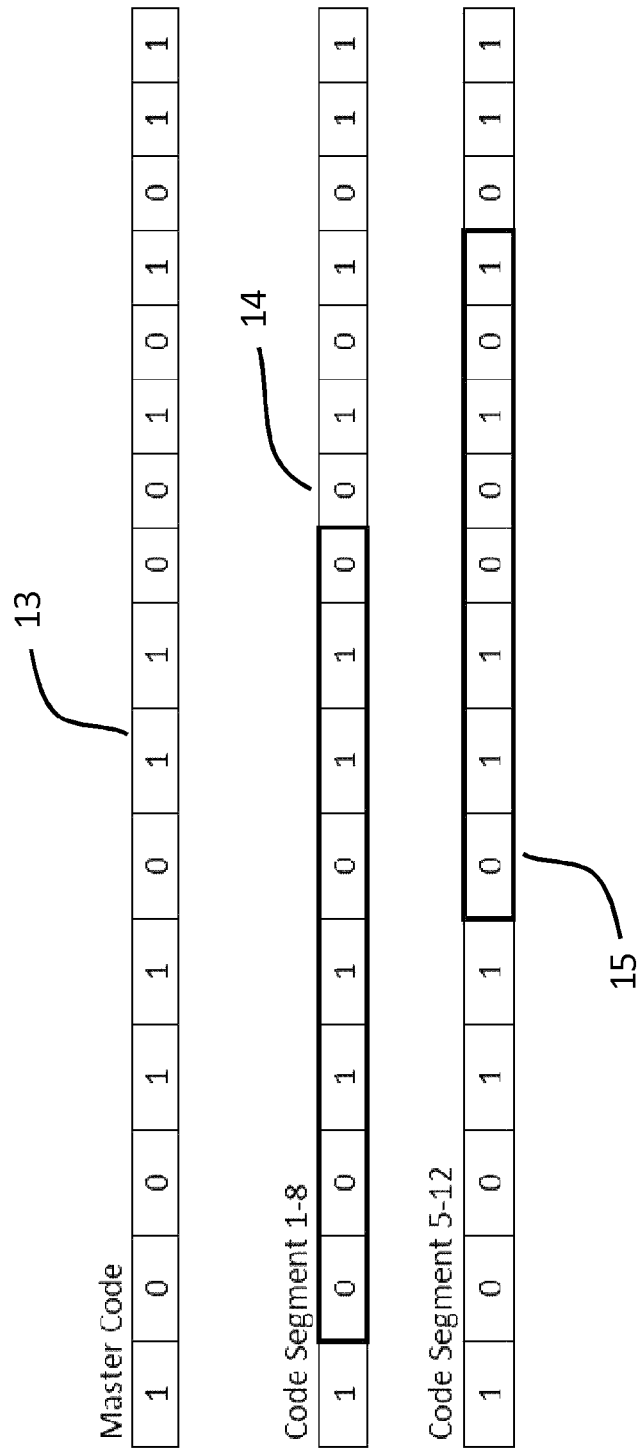
FIG. 6 shows examples of Master Code Segmentation.

FIG. 6 shows an example of a Master Key Code 13 being segmented into Active Code Segments 14 and 15.

Prior to use, the SMRre Base and the SMRre Remote Key Fob have been programmed together as an operational Transmit-Receive (Tx-Rx) pair ready for use.

The SMRre Base 3 within Asset 1 periodically scans via its receive antenna 4, for the reception of an acceptable sync signal transmitted by a Remote Key Fob 2 (RK Fob). The Sync Frame can contain many parts, one of which is the identification number of the transmitting RK Fob. When an acceptable sync ID is received, the SMRre Base 3 begins to align itself with the timing of the RK Fob as presented in repeated Sync Frames. The RK Fob continues to send Sync frames until either the SMRre Base indicates reception of the Sync, or the RK Fob stops sending the Sync either by way of timer expiration or user action.

After the Sync protocol is satisfied, the RK Fob 2 begins to transmit a Coded Start to which the SMRre Base 3 will further align. The Coded Start indicates the timing for the Access Code transmission. After that, Access Code transmission begins.

By the time the Access Code transmission begins, the SMRre Base can determine exactly when the RK Fob will be actively sending the Access Code. This timing alignment allows the SMRre Base and RK Fob to transmit simultaneously. The SMRre Base begins sending an interfering Mask, while the RK Fob sends the appropriate Access Code. Thus, during the period of Access Code Transmission, the SMRre Base is transmitting (through Tx Antenna 5) and receiving (through Rx Antenna 4) at the same time. The RK Fob will be Transmitting only. The SMRre Base receives both the transmitted masking signal sent from itself and the legitimate Access Code signal sent from the RK Fob. The Base knows what it sent, and when it sent it. No other receiver in the area can know this. Therefore, only the Base Receiver can strip the added transmit mask from the combined Base-Fob transmission. Upon reception of the appropriate Access Code, the SMRre Base unlocks the Asset 1. For clarification, FIG. 2 is provided which shows the simplified communication sequence between the SMRre Base 3 and the SMRre RK Fob 2.

There are any number of self-masking modes and modulation types which could be used and which are within the scope of the present invention. The SMRre could employ a time-based scheme (OOK, TDMA, etc.), a frequency or phase based scheme (FSK, QPSK, etc.), an amplitude based scheme (QAM, etc.), a coding based scheme (CDMA, etc.), or any combination thereof. The preferred method is based upon the use of OOK (On-Off Keying) because of its simplicity and its popularity with remote key entry systems popular today.

OOK systems transmit a known sequence by way of transmitting a fixed frequency only during prescribed time periods. Thus, the transmitter simply turns On and Off. The ON periods represent a "1", or logic high, while the OFF periods represent a "0", or logic low. Both the transmitter and Receiver know the symbol timing period (T), each symbol is separated by one timing period. The OOK receiver looks for an active burst to occur in each period window. If the receiver detects a burst at the appropriate time, a "1" is recognized. If no burst is received, a "0" is recognized. A simple key code might look like 6 (10110010)—each symbol is one bit and occupies one symbol period T. In today's OOK systems the symbols are typically equally spaced. The transmitted sequence for the above key code is On, Off, On, On, Off, Off, On, OFF. After the last bit of the code is transmitted, the key code transmitter can simply turn off, or it can transmit a known trailer sequence to indicate End-of-Transmission to the receiver, and then turn off.

Period Expansion and Code Schemes

The SMRre will typically expand symbol timing by some amount in order to facilitate the coincidence of the SMRre base and Fob transmissions. A 4T symbol expansion 7 could be used for example. In this example, the RK Fob will transmit in the gray spaces and the Base will transmit in the white spaces. Note that there are actually four available sub-symbol (SS) periods. The RK Fob can use any or all of its active sub-symbols as an ON opportunity. The Base will transmit randomly in the available remaining sub-symbol opportunities. The Base receiver will be operating on all of the sub-symbols. The Base will know which of the Base Tx opportunities should be occupied. If energy is seen when there should be none, the code is rejected. The Base also knows which RK Fob SS opportunities should be occupied. If an appropriate sequence of ON periods are received within the available RK Fob SS opportunities, then the code transmitted by the RK Fob is accepted.

Any number of OOK schemes are available for use. Sub-Symbol one and two 7,8 is one possible scheme. First and Last Sub-Symbol Scheme 9,10 is another possible scheme. The RK Fob can send the same Code Scheme over and over or mix codes. Because in this example there are two available sub-symbol opportunities, the RK Fob can randomly select to use one or the other from Code Frame to Code Frame while at the same time satisfying the key code requirements. This makes it extremely difficult for the code to be intercepted, since the Code Frames will rarely be repeated.

Again, it is important to note that the simple record and play intercept method will not work with the SMRre system. Any recorded Base-Fob transaction will have the Base recorded too. So, if an attempt is made to re-transmit a previous Base-Fob transaction the Base will detect this fact, because there will inevitably be sub-symbol intervals occupied with previous Base transmissions that the Base did not emit in the present key code correspondence. The SMRre Base can detect such a spoofing attempt and sound an alarm, take a picture of the surrounding area, send a text to the owner of the Asset, and take other like actions. Thus the SMRre of the present invention offers not only enhances enhanced security but can provide a method for detecting suspect activity.

Fob Master—Base Slave Alignment

The SMRre Base 3 aligns its Tx timing to the timing of the SMRre RK Fob 2. In addition, the Base Aligns its frequency, amplitude and timing to the RK Fob. The better the match between symbol timing, frequency and amplitude levels (between the Base in the RK Fob), the more difficult it will be to isolate the active code transmitted by the Fob from the masking code transmitted by the Base, and thus capture the RK Fob transmission. Periodic self-calibration of the Base Rx to the Base Tx helps limit multi-path fading issues. In addition, the RK Fob can include as part of the Sync Sequence an estimation of its own transmit power—the base can thus estimate the path loss between the SMRre Fob and the SMRre Base to adjust the SMRre Base transmit level to compensate for the approximate path loss. It is thus important that parameters of the signals transmitted by the Fob or remote unit be similar to the same parameters in the masking signal transmitted by the Base. By similar, I mean that the signals have approximately the same amplitudes, frequencies and timing.

Frequency, Amplitude and Timing Modulation

Even though the Base will attempt to match the RK Fob Timing and Amplitude as best as possible, a sophisticated hacker might still attempt to distinguish and thus isolate the RK Fob transmission. To make this even more difficult, both the SMRre Base and the SMRre Fob can modulate their transmit power level (up and down) while shifting their output frequency and timing to make isolation of the RK Fob transmission much more difficult. This works with any type of modulation. As an example, OOK is a highly robust method of communication operating with low signal to noise ratios (SNR) and without the need for precise symbol timing alignment. As such, the SNR and timing margins can by reduced somewhat without excessive degradation of the overall system SNR and error rate by the use of timing, frequency and amplitude shifting to enhance system security.

Base Ready Feedback

It is possible that the user of the RK Fob will be out of range when an attempt is made to use the system. If so, the SMRre Base may not know that the RK Fob is active and the RK Fob could be transmitting the key code in the absence of signal masking from the Base. If this happens, an eavesdropper could easily detect the RK Fob transmission and re-transmit this broadcast later.

This exposure can be greatly reduced through the use of SMRre Base feedback. Transmission of the RK Fob Access Code requires that a Base Ready Feedback signal be received by the Fob. The RK Fob can do this automatically, by way of coded Key transfer—such as an Encrypted Key Exchange (ECE). The RK Fob can send the sync along with a key and wait until the correct response is received. This is highly secure and known in the industry, but does require that the RK Fob add receive functionality and enhanced processing ability.

A far simpler way to manage SMRre Base Feedback is by way of Visual Base Confirmation (VBC). In this case, the user of the RK Fob would be required to wait until the SMRre Base provides visual confirmation before the Access Code is sent. The SMRre Base could signal "Ready" by way of an audible sound or visual signal. The user of the RK Fob, would not initiate the transmission of the actual Access Code until the SMRre Base signals that it is in range of the RK Fob, timing has been aligned and all coding schemes are understood. This can be accomplished by the use of multiple Fob buttons or a single-click for sync Tx, double-click for Code Tx initiation, etc.

Another scheme that can be used when the Fob has receive capability is for the Fob to transmit sync, and then wait for a ready signal from the Base before continuing transmission. The Fob can then either transmit a simple preamble, retransmit sync to begin a normal transmission sequence.

Enhanced Security—Active Key Code Symbol Shifting

To further improve the immunity to code intercept, the SMRre can use an adjustable Symbol Shift of the Key Code placement within an active Code Frame. The Code Frame can be made larger than necessary to transmit the code sequence, where the active code can be placed anywhere within that Code Frame. The remaining inactive portion of the Code Frame is padded with random content. As an example, FIG. 5 demonstrates a shifting of Code Key 6 into Key Code Frame 11 by way of an offset of four symbols. Key Code Frame 12 demonstrates an offset of seven symbols. Note that the remaining inactive portions of Key Code Frames 11 and 12 are padded randomly with filler symbols. The RK Fob can randomly select the offset which it will use to shift the Key Code within the Key Code Frame window. The RK Fob can send this offset as part of the Sync Messaging. The Sync can be encoded by any number of coding schemes, thus making it difficult to the hacker to determine the location of the Active Key Code segment within the Code Frame.

Enhanced Security—Master Code Segmentation

To further improve the immunity to code intercept, the system can add the ability of Master Code Segmentation. The SMRre Base and SMRre RK Fob can be loaded with lengthy Master Codes, from which shorter active segments can be selected as the Active Key Code. FIG. 6 demonstrates the Segmentation of a sixteen bit Master Code 13 into different eight bit Active Key Code Segments. Active Key Code Segments of (1-8) 14, and (5-12) 15 are shown. The RK Fob can randomly select the Active Key Code Segment and send this as part of the encoded Sync message.

Combined Security Features

Any number of the aforementioned security enhancements can be combined depending on the sensitivity of secured Asset. The most secure applications might use the combination of Code Schemes, Random Symbol Offsets and Master Code Segmentation along with any other security enhancement (such as rolling codes). While Assets of lesser value, might not use any Enhanced Security Option. The SMRre will have excellent security even when used with the most basic of features.

Transmit Directivity

To further secure the SMRre Fob Key Code, either or both of the SMRre Base and SMRre Fob can employ transmit directivity. This can make the hacker's use of a directional receive antennas less effective.

Other Modes of Signal Propagation

The Self Masking Code Receiver System can also be used with other modes of signal propagation. As an example, the SMRre is ideal for any kind of audio key application because such applications tend to be used in close proximity which makes Amplitude matching far less complex. Multi-path fading is also not a factor in audio keyed applications. Thus the SMRre would ideal for use in Cell Phone Audio, or any other audio key application.

Two Way Communication

While the majority of the information described herein relates specifically to the one way communication system, the SMR can be used as a two way device. To do so, each transceiver would have self-masking receivers. There would be a need for a 2-way communication protocol layer added on top of the secured physical layer (layer 1). Such a protocol could be established within the user community such that either one, or both transceivers would have the ability to define the call parameters (Tx-Rx scheduling, encoding schemes, etc.) at the onset of the call. Once a communication link is setup, the layer 1 security parameters, including all pertinent SMR operational parameters, could be known and followed by all parties involved.

OOK Vulnerabilities and Mitigation

OOK was previously described as in introduction to the SMR concept because of its relative simplicity and popularity among remote entry platforms. However, because the SMRre base and SMRre RK Fob need to transmit at different active symbol opportunities, the SMRre RK Fob may need to first indicate which opportunities it will be using. Because of this, there would need to be an interval of time during which only the SMRre RK Fob is transmitting. This means that critical information of the forthcoming code transmission would not be masked by the SMRre base.

To eliminate the necessity of intervals where only the SMRre RK Fob is transmitting, the SMRbase can transmit its mask continuously even during the sync interval. Continuous transmission of the base leads to the inevitable collision of the SMRbase and SMRkey transmissions. This does not prevent recovery by the base because the base knows the amplitude and timing of its own transmission. Therefore, the SMRre base is able to detect differences between the base signal transmission and the composite signal (SMRre base Tx+SMRre RK Fob Tx) that the SMRre base receives. The SMRre base can compare, on a symbol interval by symbol interval basis, the power of the symbol energy that it receives to the symbol energy that it sends. Any composite symbol energy received by the base that does not differ sufficiently from the symbol energy sent by the base can be considered a "0". Any composite symbol energy received by the base that does differ sufficiently from the symbol energy sent by the base can be considered a "1". Note that this difference may not always be positive because both the base and the remote may be modulating their phases along with their amplitudes. Therefore, the phases of some composite combinations may be destructive thus summing to a reduced amplitude.

Adding the ability to resolve collisions leads to far greater security because it reduces the SMRre RK Fob Tx only interval. The RK Fob only needs to transmit its signal in isolation to allow for the alignment of the basic Base-RK Fob physical layer transmit attributes (nominal operating frequency, amplitude and symbol timing, and the like). However, collision resolution also involves greater sophistication and expense. For instance, it generally becomes necessary to match more precisely the frequency of the Base Tx to the Remote Key Tx—which may require the implementation of a carrier recovery loop or other sophisticated data recovery algorithms, enhanced Base Tx-Base Rx calibration, or similar technique. Because of this, it can be desirable to limit the intervals of forced collision such that they occur only during certain critical intervals (such as the sync transmission needed to communicate the Sub-Symbol, Code Shifting, master Code Segmentation, or other schemes). These critical sync intervals can be transmitted several times consecutively to ensure reception thus reducing the need for greater hardware capabilities in the SMRre Base.

Frequency Shift Key Modulation

Figure 7:
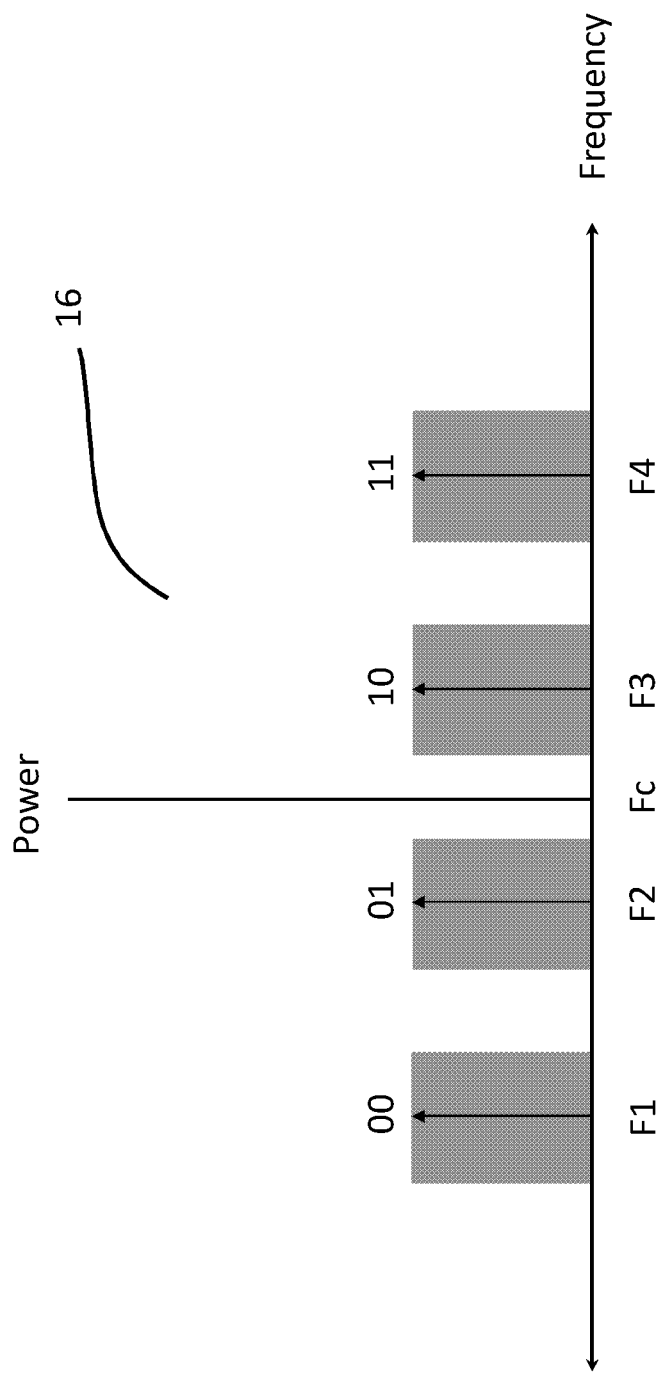
FIG. 7 shows an frequency map of a four-level FSK system.

In the present invention, any modulation scheme can be used with the SMR system. FIG. 7 shows a map of a simple Frequency Shift Key (FSK) modulation spectrum. FSK has seen wide use in a variety of communication systems and is well known to the communications industry. In this example, 16 maps 4-level FSK. Each specific frequency is a symbol, and each symbol represents 2 bits. This is twice the data/symbol density of OOK modulation which was 1 bit/symbol. Note that there are also shaded regions about the centers of the discrete frequency symbols. Also note that there is some amount of guard band separating the 4 regions. These regions show a simplified example of frequency decision regions. In this example, energy received in any portion of the shaded frequency regions would be considered as though the energy had occurred at the center of the boundary. This allows for the modulation of the transmit frequency in both the SMRre base and SMRre RK Fob. The RK Fob would transmit only one of the symbol locations during any symbol time opportunity. The Base can transmit any number of frequency tones across the entire FSK map.

Figure 8:
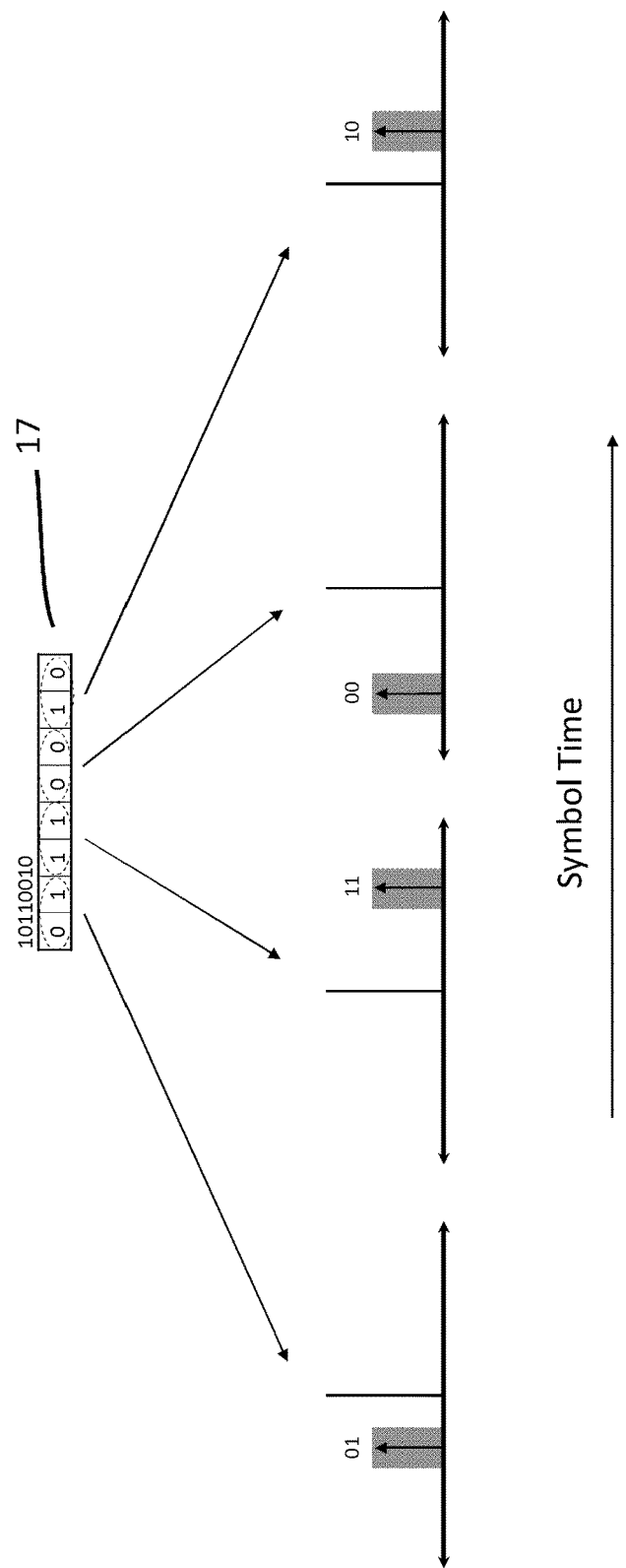
FIG. 8 shows the projection of a key code onto an FSK map.

FIG. 8 shows a projection of a simplified key code unto an FSK map. Specifically, 17 demonstrates the 2 bit/symbol partition of Code Key 6, where the dotted lines represent the symbols.

Communication of Modulation Parameters

Figure 9:
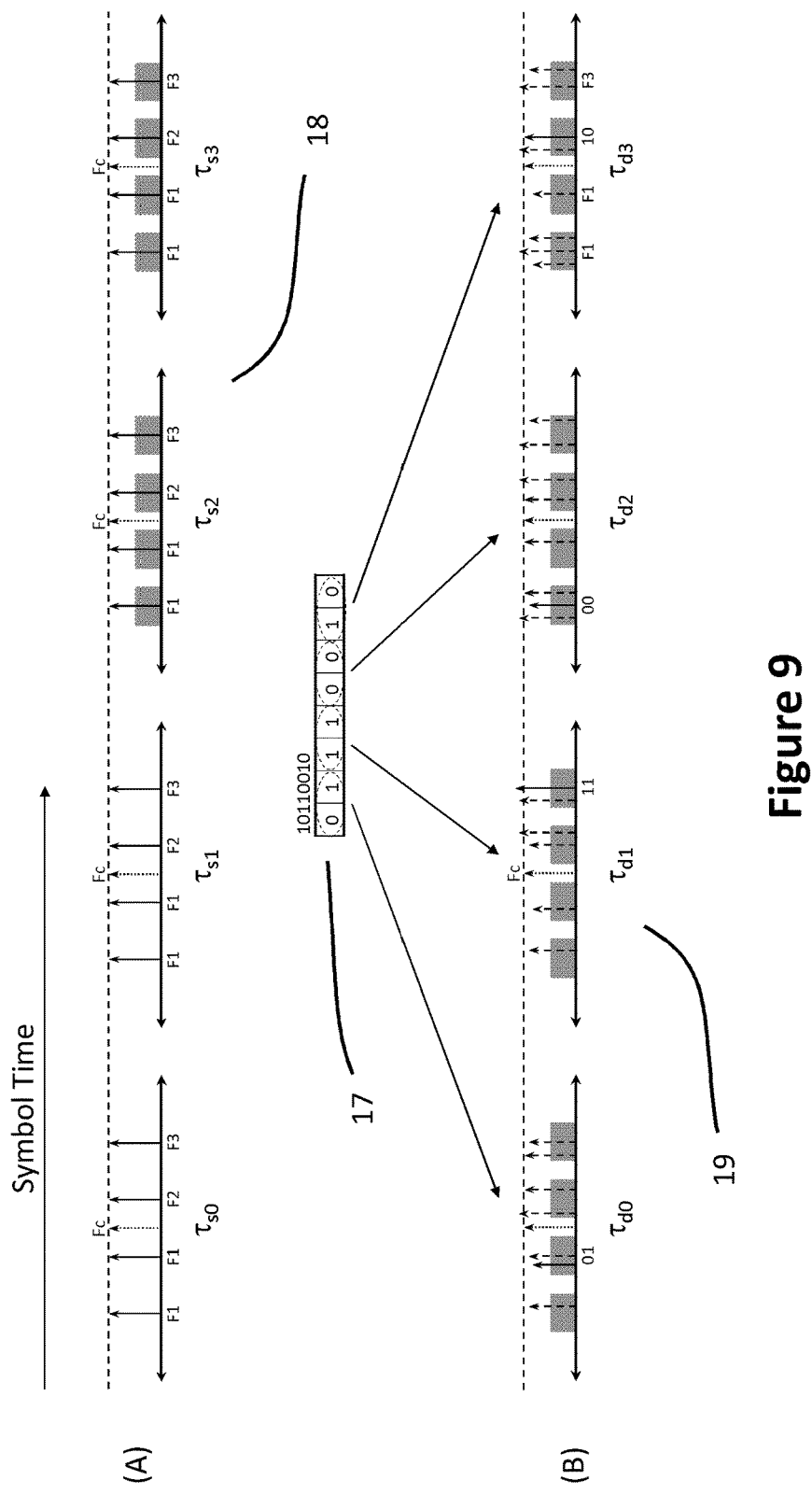
FIG. 9 shows how a Fob can pick the frequency and modulation plan.

The SMRre RK Fob can pick the frequency and modulation plan and communicate this to the base by way of a sync message. FIG. 9 demonstrates an example of this. The first part of the correspondence is the sync 18, which in this example, shows 4 bursts where all 4 FSK symbol centers are transmitted at once. These bursts map out the centers the FSK map that the RK Fob has chosen for transmission. Selection of the RK transmission characteristics can be determined in advance by the Fob itself during periods of self-calibration/characterization. The operational frequency can also be adaptive and based upon the current environment. For instance, the frequency map selection can be intelligent. The RK FOB can first listen to the active SMR band (audio, RF or other), and choose its own frequency sub-band to operate in. This selection can be dictated by the SMR protocol in use and based upon the currently occupied band (used by other devices). Or alternatively, the selection of operating frequency can be random.

It should be noted that 18 shows sync bursts being transmitted 4 times during symbol periods $\tau_{s0}$, $\tau_{s1}$, $\tau_{s2}$ and $\tau_{s3}$. By $\tau_{s2}$ and $\tau_{s3}$, it is the task of the SMR base to recognized the symbol centers. The SMRbase also interprets the decision regions (shaded) and the guard bands (the space between the regions)—both of which can be standardized by the communication protocol or more specifically mapped by the SMRre RK Fob. The interval between the bursts is the symbol rate, and the amplitude of the tones is the nominal amplitude that the remote will be transmitting. The sync may be repeated many times until the SMRre base has matched all necessary transmission and protocol specifics needed for a successful transmission of the forth coming key. These attributes include, but are not limited to the nominal frequency, amplitude and symbol timing. Once the SMRre base receiver satisfies all requirements indicating that it is locked onto the future code key correspondence, it signals ready either by a visual, audio, or other method that includes, but is not limited to visual confirmation, audio confirmation, the use of a secondary wireless medium (i.e. Bluetooth, NFC and the like).

The next step of the Base-RK correspondence is the transfer of the actual key as shown in FIG. 9 19, where the symbols are transmitted by the RK Fob such that the symbol string of 17 is mapped into the FSK regions during data symbol opportunities of $\tau_{d0}$, $\tau_{d1}$, $\tau_{d2}$ and $\tau_{d3}$. Also shown in FIG. 9 are the frequency components of the SMRre Base transmission which are occurring simultaneously to the symbol bursts of the RK Fob. For clarity, the RK Fob frequency components are shown as solid tones (continuous wave signals), and the Base frequency components are show as dotted lines. But in practice, there will be no obvious distinction between the base transmission and the RK Fob transmission. This is because each frequency component is slightly modulated in amplitude, time and such that they both operate about set nominals (nominal timing, amplitude, etc.)—this ensures overlap between transmission parameters, making it quite difficult to isolate the RK Fob transmission. Note that every symbol region in the FSK map is occupied, and many of the FSK symbol regions have multiple tones. The receive processor of the SMRre base, has knowledge of its own transmission on a symbol by symbol basis. Thus, the SMRre base receiver is able to strip off its own transmitted entities from the composite signal received.

This cancellation of the base transmission can be done many ways, such as, but not limited to, a Fast Fourier Transform (FFT) based discrimination scheme.

Various other modulation specifics and signal processing techniques must be considered in actual practice of the invention. These techniques are generally known in the art and can include matched filtering of baseband symbols, burst windowing, error correction coding and the like. It is also known in the art that different digital modulation techniques require different receive signal to noise ratios for decoding to a predetermined error rate. Typically, the more complex the modulation scheme (without special coding), the greater the signal to noise ratio needed to achieve the same error rate. Also, coherent systems enjoy and advantage over non-coherent systems. For example, coherent binary phase shift keying (PSK) enjoys a 3 dB noise advantage over non-coherent binary frequency shift keying (FSK) to achieve the same error performance. In the case of the present invention, the ranges are short, and simplicity of implementation is important. Hence, the simplicity of and ease of implementation, for example, of a four-level non-coherent FSK scheme far outweighs the small signal to noise performance improvement that might be achieved with a fully coherent system (which would require some type of coherent carrier recovery or the like). The transmit power level of the FOB is chosen so that the signal to noise ratio at the base is sufficient to assure reliable reception at the maximum range envisioned in the presence of expected noise. Of course, in the choice of FOB transmit power level, the battery life of the FOB battery must also be considered as is known in the art.

Frequency and symbol timing accuracy is also a consideration in any digital communication system. It is desirable to set up the air interface protocol in such a way that it relaxes the frequency and symbol timing accuracy requirements. Such foresight reduces or even eliminates the use of tightly compensated frequency control components (i.e. pre-aged and temperature compensated crystal oscillators, etc.). The bit rate and symbol width, along with guard times, can be chosen so that timing synchronization between the Fob and the base can occur reliably even with reference clocks that are not highly stabilized by crystal cut or temperature compensation. Thus, the range of ambient temperatures that the system must perform in, and the possible temperature differences between the Fob and the base, and their effect in clock frequency offset, must be considered in choosing timing parameters such as bit rate and symbol width. These types of determinations are known in the art.

The SMR system of the present invention is inherently robust to both timing and symbol variation. This is because while most communication platforms work by strict adherence to a tightly controlled channelization scheme, often where the frequency and timing of the remote devices are adjusted to that of the base; the SMR system works the other way around. The SMRre Base will typically align its own frequency and timing about a nominal point chosen by the SMRre RK Fob. This reversal of the communication norm reduces in particular the frequency and timing accuracy requirement (over both aging and temperature) in the RK Fob.

Random Self Masking

The Base can transmit a set of masking tones in selected symbol regions, or in all symbol regions. The base can further change the number of tones transmitted per symbol region. Thus the masking set can change from symbol period to symbol period. Only the base knows the number of masking tones transmitted per symbol region, as well as the phase, frequency and amplitude of those masking tones. During each symbol period, a new masking set can be generated by a common block within the SMRre base and sent to both transmit and receive blocks. Such an operation synchronizes the mask set at the base receiver to the mask set of the base transmitter. Thus the receive block always has a map of the transmitted mask and is able to differentiate between the spectral components sent by the remote key Fob and the spectral components sent by the Base Spectral Component Reception—FFT The Fast Fourier Transform (FFT) is a digital signal processing technique widely used in the communication industry. The FFT converts a sequence of time domain samples, taken over a duration of time, into a frequency domain equivalent. In essence, the FFT maps a frequency span in terms of discrete frequency spectral components called bins.

The FSK map of 16 shows that symbols F1, F2, F3 and F4 have an associated frequency spectrum. Assume that such an active FSK transmission is sampled in time by an analog to digital converter (ADC) in an SMRre base receiver. If an FFT is applied to this data stream, a stream of corresponding frequency bin powers results. Each bin has a discrete amount of power associated with it. Thus, each region of the FSK map has a corresponding set of FFT bins.

Reception by FFT can be quite simple in the SMRre base. The FFT maps a frequency span into a set of associated bins. So, the frequency spans of an FSK map can be mapped unto spans of FFT bins. For example, consider F0 being assigned to bins ($n_1$ to $n_{1+m}$); F1 being assigned to bins ($n_2$ to $n_{2+m}$); F3 being assigned to bins ($n_3$ to $n_{3+m}$); and F4 being assigned to bins ($n_4$ to $n_{4+m}$).

For each symbol opportunity, the SMRre base knows, in a relative sense, the precise sum of all of the bin powers sent in each bin span. The SMRre base can further normalize the sum of the bin powers in each bin span corresponding to F0, F1, F2, and F3 relative to one another. This normalization can thus accurately assess the power that is sent in each of the bin spans in a relative sense (to one another) on a symbol period by symbol period basis.

Upon receiving the composite signal comprised of both the Base and RK Fob transmissions, the processor can take the FFT of each symbol period. The processor can further sum all of the received bin powers and normalize the aggregate power in each bin span with respect to each bin span associated with the FSK map. A comparison can then be made of the ratios of the aggregate bin span powers in each frequency segment that was sent to the ratios of the aggregate bin span powers in each frequency segment that was received. The SMRre processor does not need to know the absolute powers of the frequency components, only the relative power in the aggregate of each bin span with respect to normalized bin span aggregate power. The SMRre processor can then make a determination as to which received bin power span least matches the normalized power of the bin span sets sent.

Insertion of Null Symbols

In OOK, if the transmitter of the RK Fob is off, then the base receiver assumes a "0" (simply receiving noise). In a continuous modulation domain (such as FSK, OFDM, PSK, etc.), there can also be intervals during which the RK Fob Tx remains silent. Such quiet time intervals can be considered as dead space. Assume that the base is always transmitting in these symbol spaces, so the airwaves will always have some frequency content. However, only the base understands that the RK Fob has ignored the symbol opportunity. Dealing with unoccupied RK Fob Tx opportunities is easy for the SMRre base. The base simply concatenates the active RK Fob Tx symbol opportunities to recover the intended transmit sequence. Having dead space renders as useless the interception of the occasional RK Fob transmit symbol. This is because the alignment of the intercepted symbol relative to all of the other symbols remains unknown. It should be noted that these dead symbol opportunities can vary from data frame to data frame.

Smart Phone Application

Figure 10:
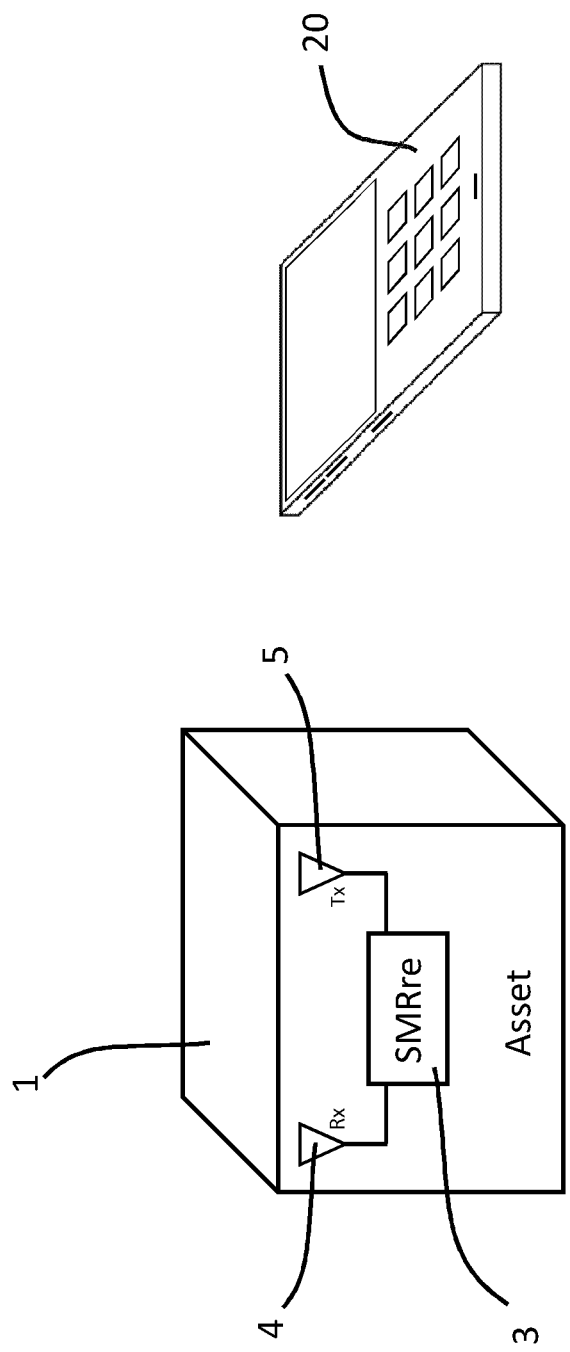
FIG. 10 shows in integration of a smart phone as the SMRre Remote Fob.

The SMRre is ideal for use with a smart phone. In FIG. 10, the RK Fob for specific use has been replaced with a smart phone 20 which in the SMR system functions as an RK Fob for general use. The smart phone can transmit and receive signals in a variety of modes including, but not limited to; RF, audio or vibration. Any smart phone in use today can be used as an SMR remote key by simply adding the necessary SMR application to the smart phone's system. The smart phone is particularly attractive as an SMR RK Fob, because smart phones allow users to interact in many different ways with the SMR system. Thus, a smart phone SMR remote key Fob application can integrate the use of custom passwords or pass codes, human interaction by way of dialog response, physical motion recognition, tap recognition etc. By adding human interaction, a much higher level of security can be obtained.

In addition, the smart phone is often carried everywhere by its owner. Thus a single smart phone with the SMRre application installed can gain access to any number of assets—a building, house, rental car or other. The same smart phone can also transmit other secure access information such as a credit card number, driver's license information and the like.

Wireless Control Overhead

The highest level of security might opt for the use of the SMR system wireless interface alone to initiate the SMR correspondence. But for the sake of convenience, the SMR system could use a secondary wireless interface in conjunction with an automated transaction mechanism to initiate the SMR receiver-remote device correspondence.

As an example, consider the application of a smart phone audio SMR system for building access. Rather than require that the user pull the phone out of his/her pocket or purse, the SMRre could use a Blue Tooth™ layer (BT) or other wireless layer to identify the entry candidate and send a corresponding wireless signal to the target smart phone. The smart phone, upon reception of an asset available BT or other message, could make ready its SMR remote transmitter and alert the user by way of an audio, vibration, or other alert. On the other hand, the system could opt for a visual or audio confirmation from the SMR base indicating that it is ready to initiate the SMR base-remote interaction. Or, the system could use any combination of visual, audio and wirelessly delivered confirmation. Either way, the user will become aware that the system has recognized his/her smart phone. To proceed, the user can simply tap the smart phone in an acceptable rhythm thus starting the remote transaction. Of course, the user can use any other method to OK the start of the initiation and alignment process, or leave it completely automated and controlled over the wireless overhead channel. The user can thus choose to configure the SMR interaction to involve the least amount of human interaction in order to maximize convenience. On the other hand, the user can choose to maximize human interaction to maximize security (including password protection, and the like).

Once the SMR base has received an appropriate code, it can optionally send a termination message by way of BT or other wireless interface to shut off the transmitter in the SMR Remote Key. The faster the SMR remote key is turned off the better as it is desirable to limit the air time of the secured number or key.

Autonomous/Unpaired Operation

The SMRre base will not always be synchronized or paired in advance with the remote transmitter. As was mentioned, the enhanced security of the SMR system allows for the remote access to be obtained for many different assets, hotels, cars, homes, places of business, etc. The SMR is also ideally suited for financial transactions (credit, debit cards, etc). Such transactions may often require system use by unregistered users.

Self-Calibration of SMRre Tx to Rx

As was previously mentioned, the SMRre Base may periodically calibrate its transmitter to its receiver. Such self-calibration would allow for a more accurate understanding of the loss coefficient from the base Tx to base Rx. Thus with periodic calibration, the base Rx has a better chance of identifying and isolating the Base Tx component of the composite Base Tx—RK Fob Tx signal received. In addition, periodic self-calibration allows for better performance in any dynamically changing multipath environment.

These periodic intervals of self-calibration can be tracked as a set of calibration coefficients stored and ready for use by the SMRre base during the next Base—RK Fob correspondence.

Several descriptions and illustrations have been presented to aid in understanding the present invention. A person of skill in the art will realize that numerous changes and variations are possible without departing from the spirit of the invention. Each of these changes and variations is within the scope of the present invention.

I claim:

1. An enhanced security system for transmitting an access sequence from a remote unit to a base station comprising:
    a remote unit that includes a transmitter;
    a base station that includes both a receiver and a transmitter;
    the remote unit constructed to transmit a sync pattern followed by the access sequence upon user activation;
    the base station constructed to transmit a masking sequence upon receipt of the sync pattern, transmission of the masking sequence by the base station coinciding with transmission of the access sequence by the remote unit;
    the base station constructed to receive a composite signal that includes both the access sequence and the masking sequence and to subtract out masking sequence from the composite signal leaving only the access sequence;
    the base station constructed to provide access if the access sequence matches a known pattern.

2. The enhanced security system of claim 1 wherein the remote station is a battery-powered FOB.

3. The enhanced security system of claim 1 wherein the remote station is a smartphone.

4. The enhanced security system of claim 1 wherein the base station matches signal amplitude and timing alignment of the masking sequence with signal amplitude and timing alignment of a received signal from the remote unit.

5. The enhanced security system of claim 1 wherein the remote unit and the base station are configured to modulate signal amplitude, signal frequency or signal timing to further mask the access code.

6. The enhanced security system of claim 1 wherein the base station provides a visual ready signal to the remote unit upon receipt of said sync pattern.

7. The enhanced security system of claim 1 wherein the remote unit also includes a receiver, and the base station sends a feedback signal to the remote unit upon receipt of sync.

8. The enhanced security system of claim 1 wherein the remote unit and the base station transmit on-off keying (OOK).

9. The enhanced security system of claim 1 wherein the remote unit and the base station transmit frequency shift keying (FSK).

10. The enhanced security system of claim 9 wherein the frequency shift keying (FSK) is four level.

11. The enhanced security system of claim 1 wherein the remote unit and the base station transmit radio signals, optical signals or audio signals.

12. A security access system comprising:

A handheld remote unit that includes a remote unit transmitter, wherein the remote unit transmitter is constructed to transmit radio, optical or audio signals; the remote unit including a control circuit configured to modulate and transmit said radio, optical or audio signals as a first sequence of symbols, each symbol of the first sequence of symbols occupying a particular time slot;

a base station unit that includes a base station transmitter and a base station receiver; the base station transmitter configured to transmit radio, optical or audio signals; the base station receiver configured receive radio, optical or audio signals; the base station transmitter including a control circuit configured to modulate and transmit said radio, optical or audio signals as a second sequence of symbols, each symbol of the second sequence of symbols occupying a particular time slot, the second sequence of symbols being different from the first sequence of symbols;

the base station transmitter configured to transmit the second transmitted sequence of symbols simultaneously while the remote unit transmits the first sequence of symbols, wherein the second sequence of symbols is a masking signal masking the first sequence of symbols received by any receiver in range of the remote unit transmitter;

the base station receiver configured to receive both the first sequence of symbols transmitted by the remote unit transmitter, and the second sequence of symbols transmitted by base station transmitter as a composite third sequence of symbols;

the base station receiver further configured to subtract the second sequence of symbols transmitted by the base station transmitter from the composite third sequence of symbols thus recovering the first sequence of symbols;

the base station unit containing a control circuit constructed to allow access upon receiving the recovered first sequence of symbols if the recovered first sequence of symbols matches a particular predetermined stored template of symbols corresponding to said access.

13. The security access system of claim 12 wherein the remote unit transmitter and the base station transmitter transmit using on-off keying (OOK).

14. The security access system of claim 12 wherein the remote unit transmitter and the base station transmitter user frequency shift keying (FSK).

15. The security access system of claim 14 wherein the frequency shift keying (FSK) is four level.

16. The security access system of claim 12 wherein the remote unit is a FOB.

17. The security access system of claim 12 wherein the remote unit is a smartphone.

* * * * *